(12) United States Patent
Silbernagl et al.

(10) Patent No.: US 7,568,617 B2
(45) Date of Patent: *Aug. 4, 2009

(54) LEARNING FARE COLLECTION SYSTEM FOR MASS TRANSIT

(75) Inventors: Martin Friedrich Ludwig Silbernagl, Brooklyn, NY (US); Nathaniel Polish, New York, NY (US)

(73) Assignee: Specialty Acquirer LLC

(*) Notice: Subject to any disclaimer, the term of this patent is extended or adjusted under 35 U.S.C. 154(b) by 109 days.

This patent is subject to a terminal disclaimer.

(21) Appl. No.: 11/668,456

(22) Filed: Jan. 29, 2007

(65) Prior Publication Data
US 2008/0140516 A1  Jun. 12, 2008

Related U.S. Application Data

(60) Provisional application No. 60/869,112, filed on Dec. 7, 2006.

(51) Int. Cl.
G06K 5/00 (2006.01)
G07B 15/02 (2006.01)
G06K 7/01 (2006.01)
G07B 15/00 (2006.01)

(52) U.S. Cl. .............. 235/382; 235/375; 235/380; 235/382.5; 235/384; 705/13; 705/14

(58) Field of Classification Search .............. 235/382, 235/384, 375, 380, 382.5; 705/13, 14
See application file for complete search history.

(56) References Cited

U.S. PATENT DOCUMENTS

| | | | |
|---|---|---|---|
| 3,438,489 A | 4/1969 | Cambornac et al. | |
| 4,654,658 A | 3/1987 | Walton | |
| 4,899,036 A | 2/1990 | McCrindle et al. | |
| 5,053,774 A | 10/1991 | Schuermann et al. | |
| 5,103,079 A | 4/1992 | Barakai et al. | |
| 5,191,193 A | 3/1993 | Le Roux | |
| 5,286,955 A | 2/1994 | Klosa | |
| 5,337,063 A | 8/1994 | Takahira | |
| 5,396,558 A | 3/1995 | Ishiguro et al. | |
| 5,449,894 A | 9/1995 | Bruhnke et al. | |
| 5,479,172 A | 12/1995 | Smith et al. | |
| 5,504,321 A | 4/1996 | Sheldon | |
| 5,828,044 A | 10/1998 | Jun et al. | |
| 6,394,341 B1 * | 5/2002 | Makipaa et al. | 235/379 |
| 6,480,101 B1 | 11/2002 | Kelly et al. | |
| 6,732,922 B2 | 5/2004 | Lindgren et al. | |

(Continued)

FOREIGN PATENT DOCUMENTS

EP    0 254 595 B1    5/1994

(Continued)

OTHER PUBLICATIONS

Andara, Lael D., Ropers, Majeski, Kohn & Bentley, "Request for Ex Parte Reexamination of U.S. Patent No. 5,828,044", dated Aug. 23, 2007, 23 pages, Redwood City, California.

(Continued)

*Primary Examiner*—Thien M. Le
*Assistant Examiner*—Tuyen K Vo

(57) ABSTRACT

An implementation of a system and method for gating entry in a transit system using information from a bankcard, such as a credit card or debit card is provided.

40 Claims, 6 Drawing Sheets

U.S. PATENT DOCUMENTS

| | | | |
|---|---|---|---|
| 2002/0161729 A1* | 10/2002 | Andrews | 705/417 |
| 2002/0174013 A1* | 11/2002 | Freeman et al. | 705/14 |
| 2003/0088777 A1 | 5/2003 | Bae et al. | |
| 2005/0216405 A1 | 9/2005 | So | |
| 2006/0278704 A1* | 12/2006 | Saunders et al. | 235/382 |
| 2008/0033880 A1 | 2/2008 | Fiebiger et al. | |
| 2008/0156873 A1 | 7/2008 | Wilhelm et al. | |

FOREIGN PATENT DOCUMENTS

| | | |
|---|---|---|
| GB | 2 267 626 A | 12/1993 |
| WO | WO 94/22115 A1 | 9/1994 |
| WO | WO 97/00501 A1 | 1/1997 |
| WO | WO 2006/124808 A2 | 11/2006 |
| WO | WO 2007/090027 A2 | 8/2007 |

OTHER PUBLICATIONS

Andara, Lael D., Ropers, Majeski, Kohn & Bentley, "Exhibit D—Invalidity Claim Chart for U.S. Patent No. 5,828,044", not dated, 17 pages, Redwood City, California.

Bistrich, Austrian Patent Office, International Search Report for International Application No. PCT/KR96/00061, dated Jul. 29, 1996, 6 pages, Vienna, Austria.

"Hashing Credit Card Numbers" by Integrigy, Feb. 27, 2007 (16 pages).

"Hash function" by Wikipedia, downloaded from http://en.wikipedia.org/wiki/Hash_function on May 21, 2009 (9 pages).

"Payment Card Industry (PCI) Data Security Standard (DSS) and Payment Application Data Security Standard (PA-DSS) Glossary", Ver. 1.2, Oct. 2008 [see p. 6 "Hashing"](14 pages).

"Query data faster using sorted hash clusters" by Scott Stephens, Jul. 27, 2005, downloaded May 21, 2009 (1 page).

"Skiers now can pay for bus ride with a 'blink'" by Nicole Warburton of Deseret Morning News, Dec. 7, 2006 (2 pages).

"ISO/IEC 4909: Identification cards—Financial transaction cards—Magnetic stripe data content for track 3", First edition, Jul. 1, 2006 (21 pages).

"ISO/IEC 7812-1: Identification cards—Identification of issuers—Part 1: Numbering system", Second edition, Sep. 15, 2000 (11 pages).

"ISO/IEC 7813: Information technology—Identification cards—Financial transaction cards", Sixth edition, Jul. 1, 2006 (12 pages).

"ISO/IEC 7816-4: Identification cards—Integrated circuit cards—Part 4: Organization, security and commands for interchange", Second edition, Jan. 15, 2005 (90 pages).

"ISO/IEC 7816-5: Identification cards—Integrated circuit cards—Part 5: Registration of application providers", Second edition, Dec. 1, 2004 (13 pages).

"ISO/IEC 7816-6: Identification cards—Integrated circuit cards—Part 6: Interindustry data elements for interchange" Second edition May 15, 2004 (26 pages).

* cited by examiner

US 7,568,617 B2

LEARNING FARE COLLECTION SYSTEM FOR MASS TRANSIT

CROSS-REFERENCE TO RELATED APPLICATIONS

This application claims the benefit under 35 U.S.C. 119(e) of U.S. Provisional Application Ser. No. 60/869,112, filed Dec. 7, 2006, which is incorporated herein by reference.

BACKGROUND OF THE INVENTION

1. Field of the Invention

The invention relates generally to transit system access and more specifically to gating entry in a transit system using information from a bankcard, such as a credit card or debit card.

2. Background of the Invention

In cases where a commodity or a service is to be purchased from a merchant using a bankcard and a conventional card inquiry system, the card is inserted into a card reader, so that the magnetic stripe of the card passes through and in contact with the card reader. The card number and other data contained on the magnetic stripe's tracks are read by the card reader. The card reader transmits data, including transaction amount, through an electric line (traditionally a telephone line) to the merchant's acquirer (also called merchant bank). The acquirer is in turn connected to clearing and settlement networks through which the transaction is checked with regard to card validity and funds availability. The network then transmits an approval number or a disapproval number through the merchant's acquirer to the card reader.

However, the above described conventional card inquiry system takes at best several seconds to complete, because the transaction has to pass through several networks before reaching an authoritative entity (usually the card's issuing bank). Such a consumption of time in the conventional system has been a serious impediment in broadening markets of credit card utilization. Even if the communication speed could be accelerated, access to a telecommunication network is not available in all places where payments are made.

Therefore, a need exists to decrease an average latency when approving access to a high volume system such as a mass transit system.

SUMMARY

Some embodiments of the present invention provide for a bankcard terminal for gating entry into a first transit system, the bankcard terminal comprising: a first interface to communicate with a processing system associated with a set of transit systems including the first transit system, wherein the first interface provides for uploading information to the processing system and downloading information from the processing system; a bankcard reader comprising a receiver to receive data, as bankcard data, upon a current presentation of a bankcard by a holder; a processor, coupled to the bankcard reader and to the first interface, to receive the bankcard data and to generate a hash identifier of the currently presented bankcard; memory, coupled to the processor, to hold a list of bankcards comprising, for each bankcard in the list, a hash identifier of a bankcard previously presented, by a respective holder of the bankcard, to the processing system; and a second interface, coupled to the processor, to send a signal to an access controller.

Some embodiments of the present invention provide for a method for validating entry into a first transit system using a bankcard terminal, the method comprising: downloading, from a processing system associated with a set of transit systems including the first transit system, a list of bankcards comprising, for each bankcard in the list, a hash identifier of a bankcard previously presented, by a respective holder of the bankcard, to the processing system; receiving, from a bankcard reader, bankcard data comprising data from a bankcard currently presented by a holder of the bankcard; generating a hash identifier of the currently presented bankcard; determining whether the currently presented bankcard is contained in the list of bankcards; attempting to verify the currently presented bankcard with a bankcard verification system, if the bankcard was not contained in the list of bankcards; and denying access, if the act of attempting to verify the currently presented bankcard with the bankcard verification system results in a determination of an invalid bankcard.

Some embodiments of the present invention provide for a method for validating entry, into a first transit system, using a bankcard terminal, the method comprising: downloading, from a processing system associated with a set of transit systems including the first transit system, a list of bankcards comprising, for each bankcard in the list, a hash identifier of a bankcard previously presented, by a respective holder of the bankcard, to the processing system; receiving, from a bankcard reader, bankcard data comprising data from a bankcard currently presented by a holder of the bankcard; generating a hash identifier of the currently presented bankcard; determining whether the currently presented bankcard is contained in the list of bankcards; denying access, if the currently presented bankcard is not contained in the list of bankcards; and uploading, to the processing system, at least one bankcard identifier granted access to the first transit systems.

Some embodiments of the present invention provide for a processing system associated with a set of transit systems including at least one transit system, the processing system comprising: a first interface to communicate with at least one bankcard terminal; a processor coupled to the first interface; memory, coupled to the processor, to hold a list of bankcards comprising, for each bankcard in the list, a hash identifier of a bankcard previously presented, by a respective holder of the bankcard, to the processing system; a second interface, coupled to the processor, to communicate with a bankcard verification system; and a third interface, coupled to the processor, to communicate with a bankcard registration system.

Some embodiments of the present invention provide for a method for maintaining a list of bankcards at a processing system associated with a set of transit systems including at least one transit system, the method comprising: receiving, from a bankcard registration system, bankcard data of a bankcard currently presented by a respective holder of the bankcard; providing a hash identifier of the currently presented bankcard; determining whether the hash identifier is contained in a list of bankcards comprising, for each bankcard in the list, a hash identifier of a bankcard previously presented, by a respective holder of the bankcard, to the processing system; attempting to verify the currently presented bankcard with a bankcard verification system, if the bankcard is not contained in the list of bankcards; and downloading, to at least one bankcard terminal, the list of bankcards.

These and other aspects, features and advantages of the invention will be apparent from reference to the embodiments described hereinafter.

BRIEF DESCRIPTION OF THE DRAWINGS

Embodiments of the invention will be described, by way of example only, with reference to the drawings.

DETAILED DESCRIPTION OF THE INVENTION

Figure 1:
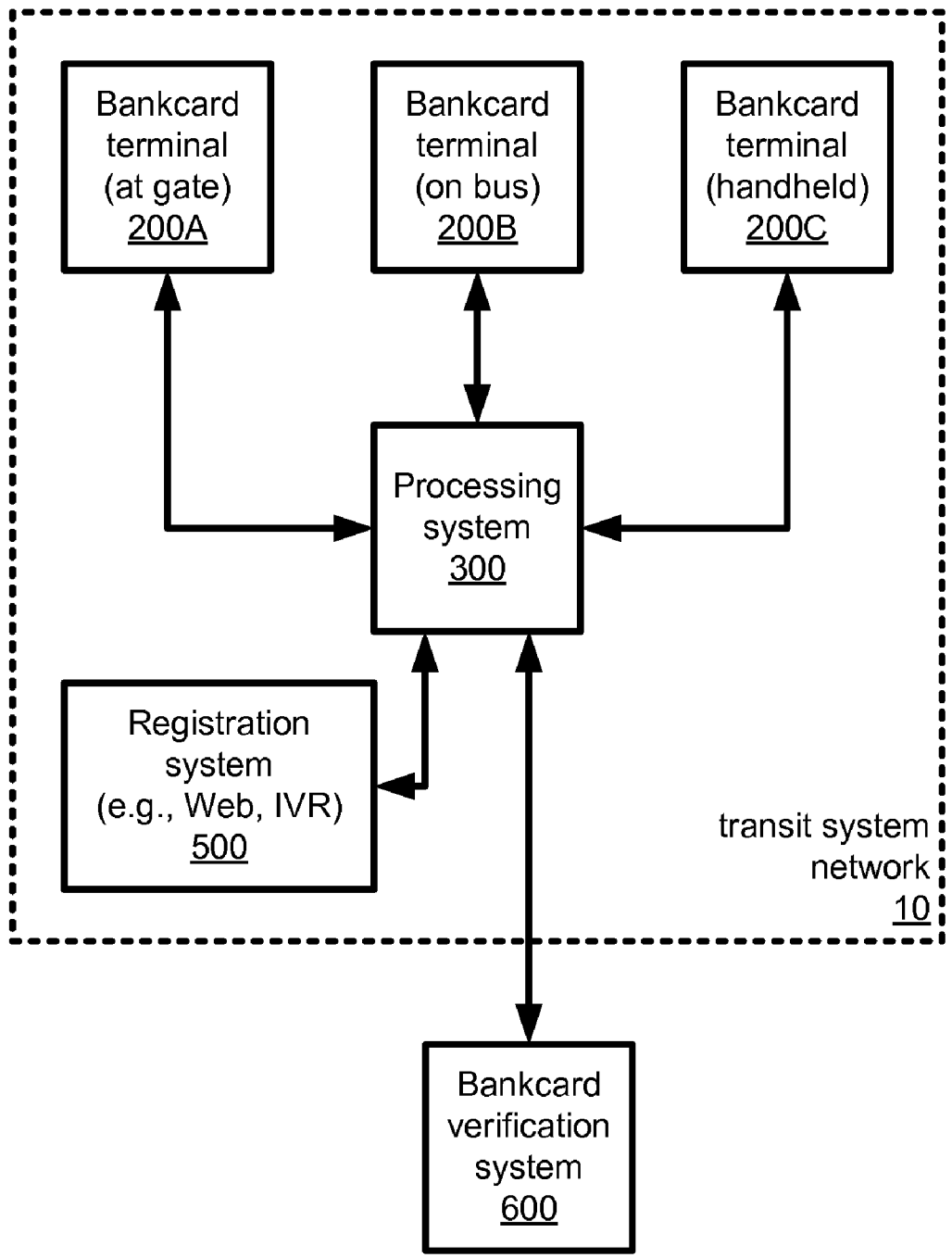
FIG. 1 shows a transit system network with an associated processing system and various components, in accordance with embodiments of the present invention.

In the following description, reference is made to the accompanying drawings, which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense. Furthermore, some portions of the detailed description that follows are presented in terms of procedures, steps, logic blocks, processing, and other symbolic representations of operations on data bits that can be performed in electronic circuitry or on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in electronic circuitry or in a computer system. These signals may be referred to at times as bits, values, elements, symbols, characters, terms, numbers, or the like. Each step may be performed by hardware, software, firmware, or combinations thereof.

A network of transit systems includes one or more transit systems providing local, regional and/or long distance commuter transportation. This transportation takes in the form of mass transit, shuttle or taxi services by way of roads, railways, air and waterways using one or more modes of transportation, such as by bus, shuttle, trolley, train, light rail, heavy rail, subway and/or the like. Entry into a transit system this often regulated by a physical gate or turnstile or by a conductor. Typically, a commuter purchases a ticket or other pass, which permits access to the transit system. Some transit systems require a commuter to purchase a transit coin, which the commuter deposits into a turnstile to open a gate.

In accordance with embodiments of the present invention, a transit system may allow a commuter to enter the transit system using a pre-registered bankcard. In some embodiments, a transit system may allow the commuter to enter the transit system using an unregistered bankcard. A bankcard assists in uniquely identifying an account of funds, contains digital data in memory, provides for access to at least some of its digital data by an external device, and may provide for contactless data transfer.

Hereinafter, a bankcard, such as a credit card or a debit card, is a payment token that may be linked to a bank account or credit line. Bankcards include cards and tokens in any of a number of form factors. A bankcard may be dimensioned in accordance with ISO 7810/7813 ID1 (about 3.375"×2.125"× 0.0030", commonly know as "Credit Card Format"). Alternatively, a bankcard may take other forms. A bankcard may take the form of a key fob (e.g., as issued by Speedpass™) or wristband. Alternatively, the bankcard may be embedded into or integrated with a mobile phone or other handheld device. A bankcard includes memory to hold an identifier used to uniquely identify an account for billing. The memory may be in the form of a magnetic stripe and/or may be attached to circuitry, which may be in accordance to ISO 7816. A bankcard may include or be integrated with contactless circuitry, such as ISO 14443. In some embodiments, a bankcard includes a token issued by a third party that is not a transit agency, such as a bank, credit union, a government agency (issuing a state driver's license or DMV issued identification card, federal government issued passport and/or other government issued ID).

In some embodiments, a bankcard reader may be used by a retailer, service provider and other merchant to accept payment from a bankcard holder's payment account. Bankcard readers may be located in a variety of places such as stores and kiosks. Clearing and settlement networks may be used by a retailer, service provider and other merchant to receive payment from an account holder's credit card or debit card account via the merchant's acquirer. An example of a clearing and settlement network are computing resources available via the MasterCard® Banknet® telecommunications network, such as the Global Clearing Management System (GCMS), and the Settlement Account Management (SAM) system. Another are the resources available through VISA® VisaNet. An account holder linked to a bankcard may belong to the bankcard holder or, alternatively, may be linked to another entity such as the bankcard holder's employer, parent, spouse or other family member. For additional detail, see U.S. Pat. No. 5,828,044, the contents of which are incorporated by reference herein.

A solution to both of the above problems is a system that can accept bankcards off-line and can also provide an acceptable business risk of accepting bad bankcards. In such a system, payment terminals are communicating transaction data to the acquirer asynchronously (meaning the payment terminal records a transaction's data, including card data, for later communication to the acquirer). Additionally, the terminal decides off-line whether a card should be accepted or denied. In other words, the terminal does not contact the card's issuer to obtain authorization for the transaction.

Were it not for the desire to prevent fraud and abuse of such a system, its design would be very straightforward; a payment terminal would simply buffer and store the data of all cards presented until it eventually connects to the acquirer. Unfortunately, experience dictates that systems should be equipped with a means to prevent fraud. As described above, a conventional terminal contacts the card's issuer. A system abandoning the procedure of immediate verification brings about a need for an alternative scheme or technique to limit fraud and abuse.

One method maintains a black list (e.g., see, U.S. Pat. No. 5,828,044). In this method, the payment terminal uses a periodically updated black list to support the approval-denial decision. In accordance with the current invention, a system using this method would place a card identifier on a black list if charges to the card holder's account could not be cleared. Placing the card on the black list aids in preventing future charges that may also fail to clear. In some embodiments, a card is placed on a black list with a single failed clearing attempt. In other embodiments, a card is placed on the black list after a predetermined number of failures of a clearing occur. Once an outstanding debt has been repaid, the system would remove the card identifier from the black list. Unfortunately the security of this scheme may be thwarted by a generic bankcard that is reprogrammed prior to each use such that it had different account information. A black list approach alone will be ineffective if such a generic bankcard is used.

Another method maintains a white list. In accordance with the current invention, a white list contains card information for each card pre-validated or pre-registered for the system. A system using cards that are validated before a first use substantially reduces the business risk inherent with the black list system describe above, in which a card is black listed after the offending transaction(s) have already been approved by the payment terminal. The fact that a bad card cannot be detected until after an initial presentation may be a bigger problem than immediately obvious. For example, a smart card could be programmed to give the payment terminal a different, made-up, credit card number every time it is used. Such a card could never be properly black listed.

Pre-registration forces an additional step, which inhibits the consumers in making a purchase. To maintain consumer convenience, a black list system may further include heuristic checks to assist in preventing severe fraud. Heuristic checks are particularly suited to contactless credit cards. Such a heuristic security scheme may measure and score a large number of secondary indicia. Such indicia could include: (1) any card identifiers, such as Card Holder Name, Account Identifier, Chip Model, Chip Serial Number, Chip Manufacturer Identifier; (2) make and version of the Card Operating System of the Smart Card if any (e.g., Open Platform or MULTOS); (3) transaction flow, including overall transaction time (e.g., whether or not prolonged pauses are experienced in a particular step of the transaction, or whether or not any step performs slower or faster than expected); and/or (4) CVC1/CVC3 checking (note that even though the card verification code might not be verified in an off-line environment, it may be stored for later validation, leading to the black listing of a card if it does not clear; also note that for a CVC1 or if the CVC3 is determined to be static, it may be used in future validations).

These measurements may be scored by any of a plurality of algorithms, some specific to a measurement or class of measurements. The overall score may be compared to a preset threshold to determine whether the transaction will be accepted or not. Such scoring algorithms could include the following: (1) change of static indicia (e.g., whether or not any of the card's static attributes change, such as the identifiers, the card operating system or the expiration date; note that provisions may be made for replacement cards, where replaced cards must be rejected and a velocity check must be performed on the number of new cards per card holder); (2) duplicate unique attributes (e.g., whether or not another card has an identical attributes, even though it is supposed to be unique; examples of unique attributes include the account number or card serial number; note that a special case to consider includes where cardholders shares an account, so that their cards have the same card number); (3) black and white lists (e.g., whether or not a card is marked as inactive in a negative list or the card is marked as active in a positive list); and/or (4) time series analysis (e.g., whether or not a time series analysis of a measurement's past results indicate that the current result is unexpected; note that such time series analysis ranges from simple statistics such as a velocity check (for example, "no more than 3 authentications per minute") to advanced usage pattern analysis such as geographical location checking (for example, "if last transaction occurred more than 120 miles away and within an hour, then it cannot be valid.")).

In either approach (i.e., a pre-registration system using a white list or post-validation system using a black list), the bankcards function primarily as identifying tokens until the total charge is computed on a back-end fare processor.

Conceptually, such a fare processor may be situated between the payment terminals and the acquirer. The fare processor receives records of all bankcards that are presented to the payment terminals. The fare processor also computes a final charge due when desirable (e.g., after a sufficient number of presentation records have been received) and may retroactively correct charges when additional records indicate that the rider was overcharged or undercharged. These computations and corrections are necessary to account for complex fare products such as those involving transfers or inter-regional travel. For this purpose, the fare processor may have access to an historical database in which past bankcard presentations are recorded, including purchases of time, distance and ride-based passes, as well as other related information, such as age of a rider (for age discounts), linkage to multiple cards belonging to a single person and/or linkage to transit benefit accounts.

Bankcards are a natural choice of identifying token for mass transit because they are widely available and are intrinsically linked to a credit account and/or a debit account. Still, an off-line payment system may be designed to use other identifiers, such as a government ID (e.g., driver's license) or proprietary tokens (e.g., a Mobil Speedpass™). In cases where such a token is not intrinsically linked to a credit or debit account, that link may be established, for example, through a website, via the phone or over the counter.

Conversely, bankcards can be used as identifying tokens, even if no payment is due. For example, a bankcard may be used for file retrieval (e.g., in the medical field), for building access, for information access, for age verification and/or for check out purposes in a public library. Using a credit card for access control has the added advantage that stealing a credit card might be a felony, while stealing a non-credit card dedicated identifier might not be a felony.

In addition to using a bankcard in a mass transit system (for example, a system having payment terminals embedded in subway gates or at fare boxes) as described above, other domains may use such off-line credit card terminals. For example: (1) purchases while being transported (e.g., in a plane, train, ship such as meals, entertainment, vending purchases and communications access fees); (2) donations to government programs (e.g., to parks and clean highway programs); (3) purchases at campgrounds (e.g., services, boat rental, firewood and trail access); (4) payment for municipal services (e.g., parking meters, garbage depots, swimming pools); (5) charity and gifts (e.g., by way of street solicitation with branded and trusted portable units); (6) purchase from street, beach, and stadium vendors (e.g., for hot dogs, ice cream, beverages or entertainment); and (7) other off-the-grid sales (e.g., fairground kiosks, food delivered to home, bicycle couriers, concerts, etc.).

Contactless bankcards, such as ISO 14443 cards that employ the MasterCard® PayPass™ application, are particularly suitable for use in the afore mentioned applications of off-line terminals. This is to a large part because contactless readers require very little maintenance and may be made more vandal resistant than contact readers. Also a contactless card does not make use of a card's magnetic stripe, which may otherwise wear out relatively quickly with frequent use (e.g., when used twice a day to pay for the subway) in a contact-type system. Contactless cards further provide some benefits that are unavailable with magnetic stripe cards (e.g., it is possible to gain exit data in a transit system).

Many mass transit systems require the presentation of a payment token upon entry, but only some require the presentation on exit of the system or vehicle. To facilitate the gathering of ridership statistics, which are vital in deciding where to make the capital investments, an antenna may be installed near an exit (e.g., in the ground underneath gates, or in the floor of a bus exit) to collect exit information without explicit presentment of the card by the rider. At the exit as the card holder walks over the antenna, the card holder's cards are read. In some environments, not every card would be successfully read, for example, because the reader may be working far outside the ISO 14443 specification. As a result, the information gathered may suffice for statistical purposes.

FIG. 1 shows a transit system network 10 with an associated processing system 300 and various components, in accordance with embodiments of the present invention. Transit system network 10 includes bankcard terminals 200. Bankcard terminals 200 provide a front-end interface to bankcards. A bankcard terminal 200A may take the form of a turnstile at a gate in subway system. A bankcard terminal 200B may and the only integrated into a bill or coin collection terminal on a bus. A bankcard terminal 200C maybe a handheld device used by a conductor in a train. Collecting information from each of the bankcard terminals 200 is a processing system 300. Processing system 300 may interface to a bankcard terminal via a wired connection or a wireless connection. The interface may provide a real-time connection, such as a dedicated wire between a turnstile at a gate and processing system 300. Alternatively, the interface may provide be an intermittent connection, such as a wireless connection. In some cases, a connection between a bankcard terminal 200 and processing system 300 may be made after a long period of service. For example, at the end of the day the connection may be made between a bankcard terminal 200B in a bus when the bus retires to the garage or a handheld bankcard terminal 200C is brought back to the station.

Processing system 300 may also include one or more interfaces to a registration system 500 and a bankcard verification system 600. Registration system 500 provides a back-end interface to bankcards. A bankcard holder may register a bankcard with processing system 300 via a web interface or an interactive voice response (IVR) system. Bankcard verification system 600, such as settlement and clearing networks used by credit card companies, verify that a bankcard is a currently valid bankcard.

Figure 2A:
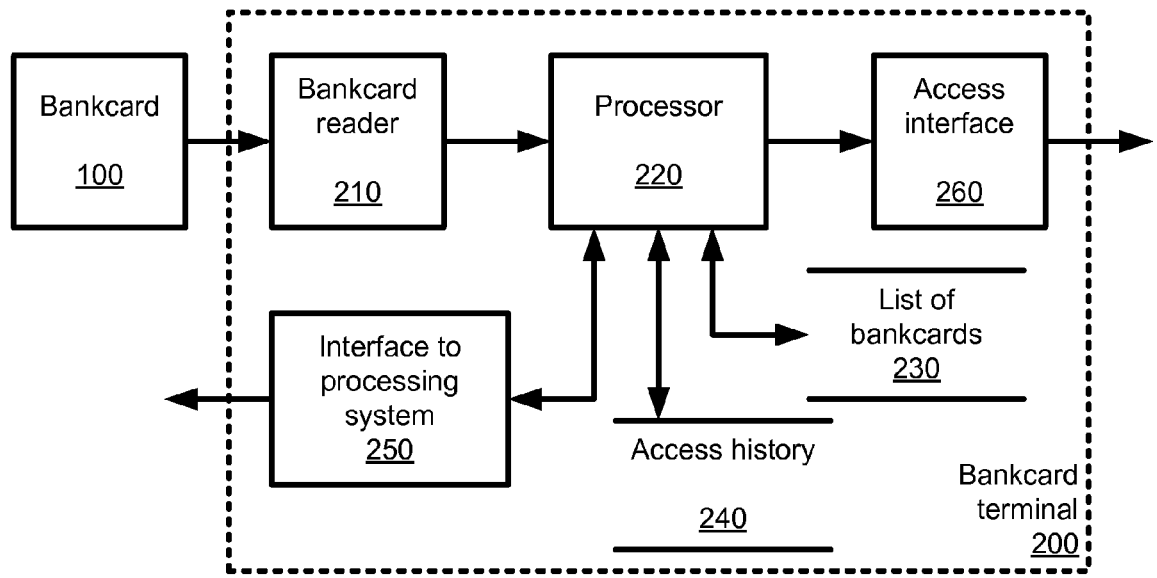
FIG. 2A shows a bankcard terminal, in accordance with embodiments of the present invention.

FIG. 2A shows a bankcard terminal 200, in accordance with embodiments of the present invention. Bankcard terminal 200 includes a bankcard reader 210, a bankcard terminal processor 220, memory to hold a list of bankcards 230 and access history 240, a first interface 250 to a processing system 300, and a second interface 260 to assist in gating access.

In some embodiments, bankcard reader 210 provides a physical, electromagnetic, optical, magnetic, and/or radio frequency (RF) interface to bankcards 100. Bankcard reader 210 may be a receiver without a transmitter or may include both a receiver and transmitter to communicate with a bankcard 100. In some embodiments, bankcard reader 210 simply reads data from bankcard 100 as bankcard 100 passes by it. In some embodiments, bankcard reader 210 transmits a signal to bankcard 100 to access bankcard data. Bankcard reader 210 forwards selective bankcard data or all bankcard data received to bankcard terminal processor 220.

Bankcard terminal processor 220 includes a first interface 250 to a processing system 300 and a second interface 260 to assist in gating access, as well as an interface to memory. Bankcard terminal processor 220 may be implemented with a microcontroller, a microprocessor and/or other logic circuitry. Bankcard terminal processor 220 reads, writes and updates data in memory, such as the list of bankcards 230, which contains a list of known bankcards, and an optional access history 240, which keeps a history of bankcards presented to bankcard terminal 200 and may be used for billing. The list of bankcards 230 and access history 240 may be in the form of one or more sequential lists, tree structures and/or databases, which may be indexed or searchable by a hash identifier of a bankcard. The list of bankcards 230, access history 240 and hash identifiers are described in more detail below.

First interface 250 provides an interface to a processing system 300. Interface 250 may be a dedicated interface providing a continuous connection between terminal bankcard 200 and processing system 300. Alternatively, first interface 250 provides for periodic or intermittent connectivity to processing system 300. With the link between first interface 250 and processing system 300 may be the wired or wireless.

Second interface 260 provides an interface to assist in gating access. To assist in gating access, in some embodiments second interface 260 may activate a barrier while in another embodiments second interface 260 may simply activate a red or green light either observable by a conductor, gate operator and/or the commuter. Second interface 260 may provide a signal to open the turnstile. Second interface 260 may provide a signal to activate an audio and/or visual announcement. For example, second interface 260 may send a signal to an LCD display or and LED in a handheld unit that is observed by a conductor.

Figure 2B:
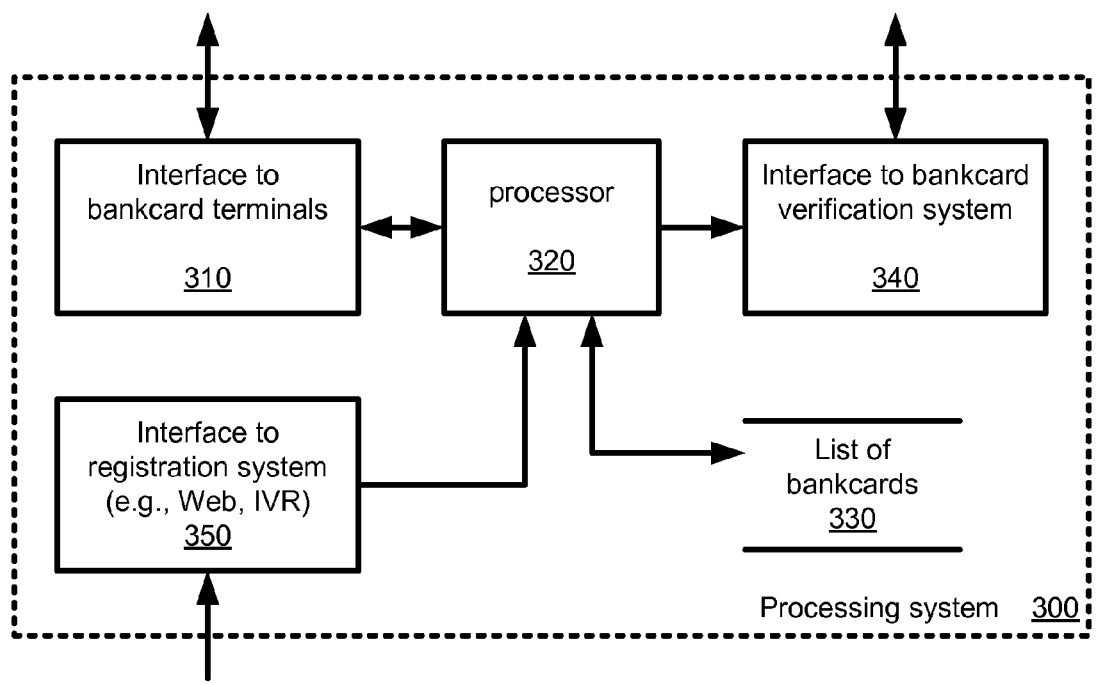
FIG. 2B shows a processing system, in accordance with embodiments of the present invention.

FIG. 2B shows a processing system 300, in accordance with embodiments of the present invention. Processing system 300 is associated with one or more transit systems and may be part of or separate from the transit systems. Processing system 300 includes a first interface 310 to communicate with one or more bankcard terminals 200, a processor 320, memory, a second interface 340 to communicate with a bankcard verification system, and a third interface 350 to communicate with a bankcard registration system.

Processor 320 is coupled to and communicates with first, second and third interfaces 310, 340 and 350, respectively. Processor 320 is also coupled to memory and manipulates a list of known bankcards 330 held in the memory. Processor 320 may be implemented with a microcontroller, a microprocessor and/or other logic circuitry.

The list of bankcards 330 contains a hash identifier of each bankcard previously presented by a respective holder of a bankcard 100 to processing system 300 and verified by processing system 300. A presentation may be by way of a physical presentation by the holder at a gate or entrance of a transit system. Alternatively, the presentation may be by way of registering the bankcard over the telephone, for example, using an IVR system, or by way of registering using the Internet, for example, using a web browser. Alternatively, the presentation may by a holder requesting a bank or other financial institution enable the bankcard with processor 320. Such a financial institution may provide multiple presentations to processor 320 in a batch process.

Interfaces 310, 320 and 340 may share a common physical interface, for example, the physical interface maybe an Ethernet connection to the Internet and/or an intranet. In this case, interfaces 310, 320 and 340 share a common physical interface but are logically three different interfaces. For example, interfaces 310, 320 and 340 may each have a unique socket identifier.

Figure 3:
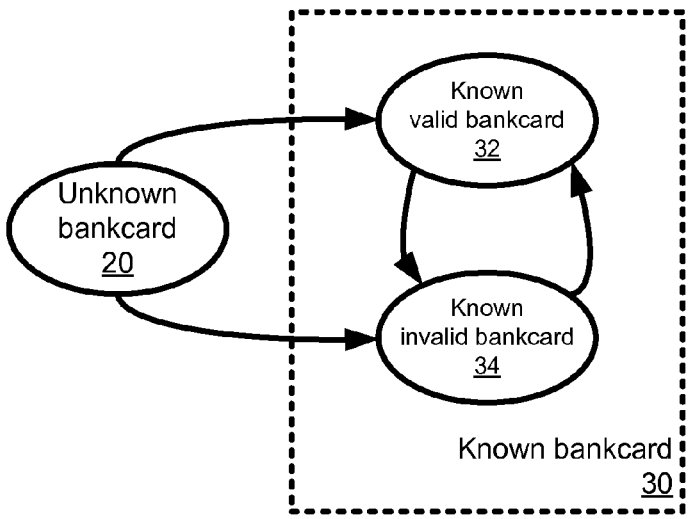
FIG. 3 illustrates a state diagram, in accordance with embodiments of the present invention.

FIG. 3 illustrates a state diagram, in accordance with embodiments of the present invention. Bankcards may be considered to be in one of two classifications: an unknown bankcard 20 or a known bankcard 30. An unknown bankcard 20 represents a bankcard that has not been presented by a respective holder of the bankcard. Thus, the list of bankcards 230 (in FIG. 2A) and the list of bankcards 330 (in FIG. 2B) will now have a hash identifier for the unknown bankcard 20.

When an unknown bankcard 20 is presented it becomes a known bankcard 30. A known bankcard 30 may also be considered to be in one of two classifications: a known valid bankcard 32 or a known invalid bankcard 34. A known valid bankcard 32 represents a bankcard that has been presented by a respective holder of the bankcard as well as verified with a bankcard verification system 600. A known invalid bankcard 34 represents a bankcard that has been presented by a respective holder of the bankcard 100; however, verification with a bankcard verification system 600 has failed in some respect. For example, bankcard terminal 200 or processing system 300 was unable to communicate with bankcard verification system 600. Alternatively, bankcard terminal 200 or processing system 300 communicated with bankcard verification system 600, which indicated bankcard 100 is somehow the invalid for a purchase. A known valid bankcard 32 may transition to a known invalid bankcard 34, for example, if an attempt to clear and settle a transaction fails. Similarly, a known invalid bankcard 34 may transition to a known valid bankcard 32, for example, if an attempt to verify or to clear and settle a transaction completes successfully.

Figure 4:
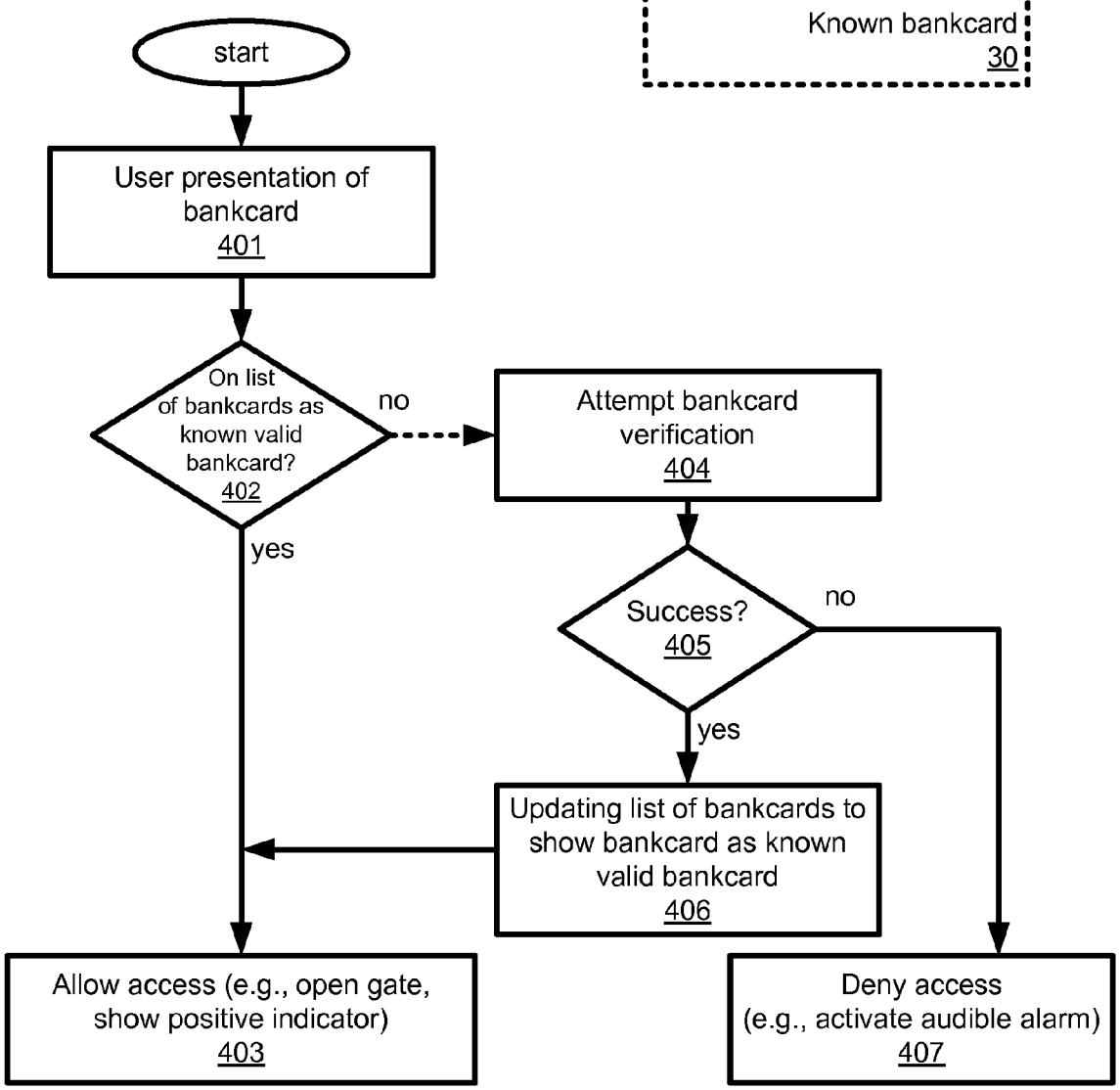
FIG. 4 represents a flowchart implementation for operations in a bankcard terminal, in accordance with embodiments of the present invention.

FIG. 4 represents a flowchart implementation for operations in a bankcard terminal 200, in accordance with embodiments of the present invention. In 401, a respective holder of a bankcard 100 presents the bankcard to a bankcard terminal 200 for access to a transit system. Bankcard terminal 200 reads, from the bankcard, bankcard data including a bankcard identifier. Bankcard terminal 200 computes a hash value based on the bankcard identifier. In 402, bankcard terminal 200 uses the hash identifier to determine whether or not the bankcard is represented a list of bankcards and whether or not the bankcard is a known valid bankcard. In some embodiments of bankcard terminal 200 that have an interface to a bankcard verification system 600, an attempt is made to verify the bankcard at 404. At 405, bankcard terminal 200 determines whether or not the bankcard was successfully verified. At 406, if the bankcard was successfully verified, the list of bankcards 230 is updated with the generated hash value for the currently presented bankcard. At 407, if the verification was unsuccessful, access is denied, for example by not opening a gate and/or by activating an audio and/or visual indicator to the bankcard holder and/or to a conductor. At 403, if the hash identifier was already in the list of bankcards as a known valid bankcard or was added to the list of bankcards (at 406), access to the transit system is allowed, for example, by opening the gate and/or by activating an audio and/or visual indicator to the bankcard holder and/or to a conductor.

Figure 5A:
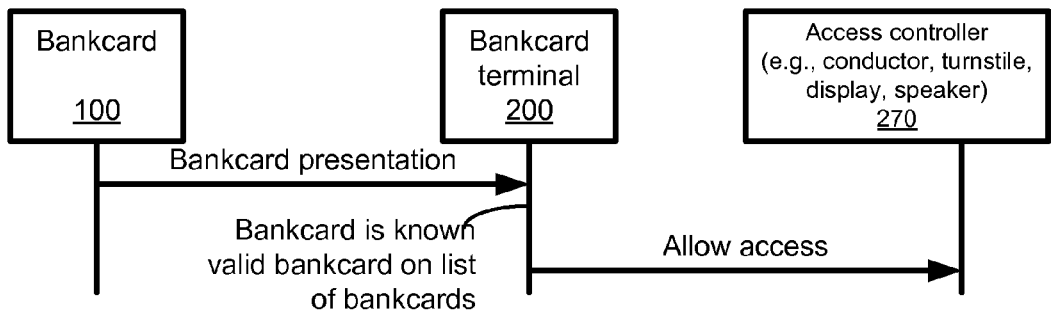
FIGS. 5A, 5B and 5C show message flow between network components, in accordance with embodiments of the present invention.
Figure 5B:
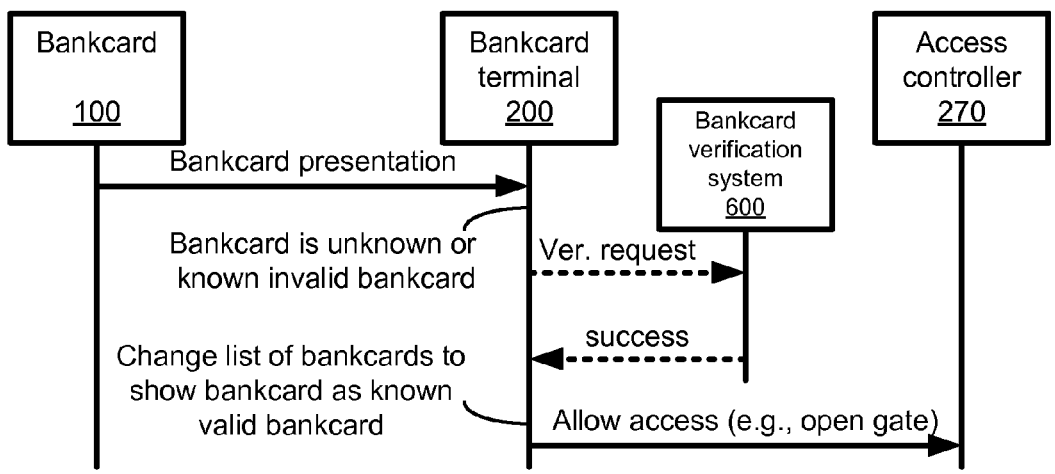
Figure 5C:
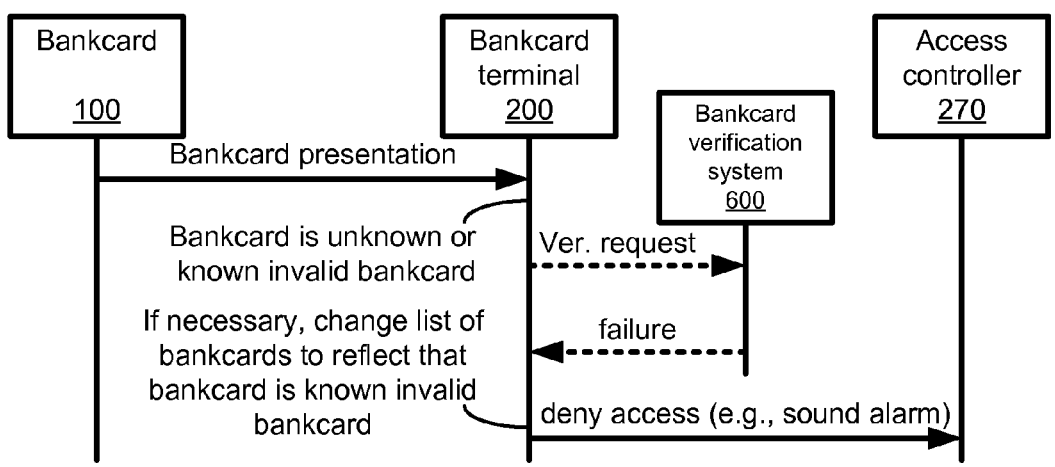

FIGS. 5A, 5B and 5C show message flow between network components, in accordance with embodiments of the present invention. In FIG. 5A, a bankcard 100 is currently presented by a bankcard holder (e.g., a subway commuter or bus rider). Bankcard reader 210 in bankcard terminal 200 receives bankcard data comprising data from the bankcard currently presented. Bankcard terminal processor 220 in bankcard terminal 200 generating a hash identifier of the currently presented bankcard then determines that the currently presented bankcard is contained in the list of bankcards. Bankcard terminal processor 220 signals second interface 260 to communicate with the access controller 270. Access controller 270 maybe, for example, a conductor, a gate of the turnstile or a bus driver or other human providing oversight or control.

To assist in gating access, in some embodiments second interface 260 may activate a barrier while another embodiments second interface 260 may simply the activate a red or green light either observable by a conductor, gate operator and/or the commuter. Second interface 260 may provide a signal to open the turnstile. Second interface 260 may provide a signal to activate an audio and/or visual announcement. For example, second interface 260 may send a signal to an LCD display or an LED in a handheld unit that is observed by a conductor.

In FIG. 5B, bankcard terminal 200 may have real-time access to bankcard verification system 600. If the bankcard is unknown, bankcard terminal 200 may attempt to validate the bankcard with bankcard verification system 600. If successful, bankcard terminal 200 allows access and update the list of bankcards to show the currently presented bankcard is a known valid bankcard. In FIG. 5C, bankcard terminal 200 fails to successfully validate the bankcard. In this case, access is denied, for example, by sounding alarm and/or not opening a gate.

Figure 6:
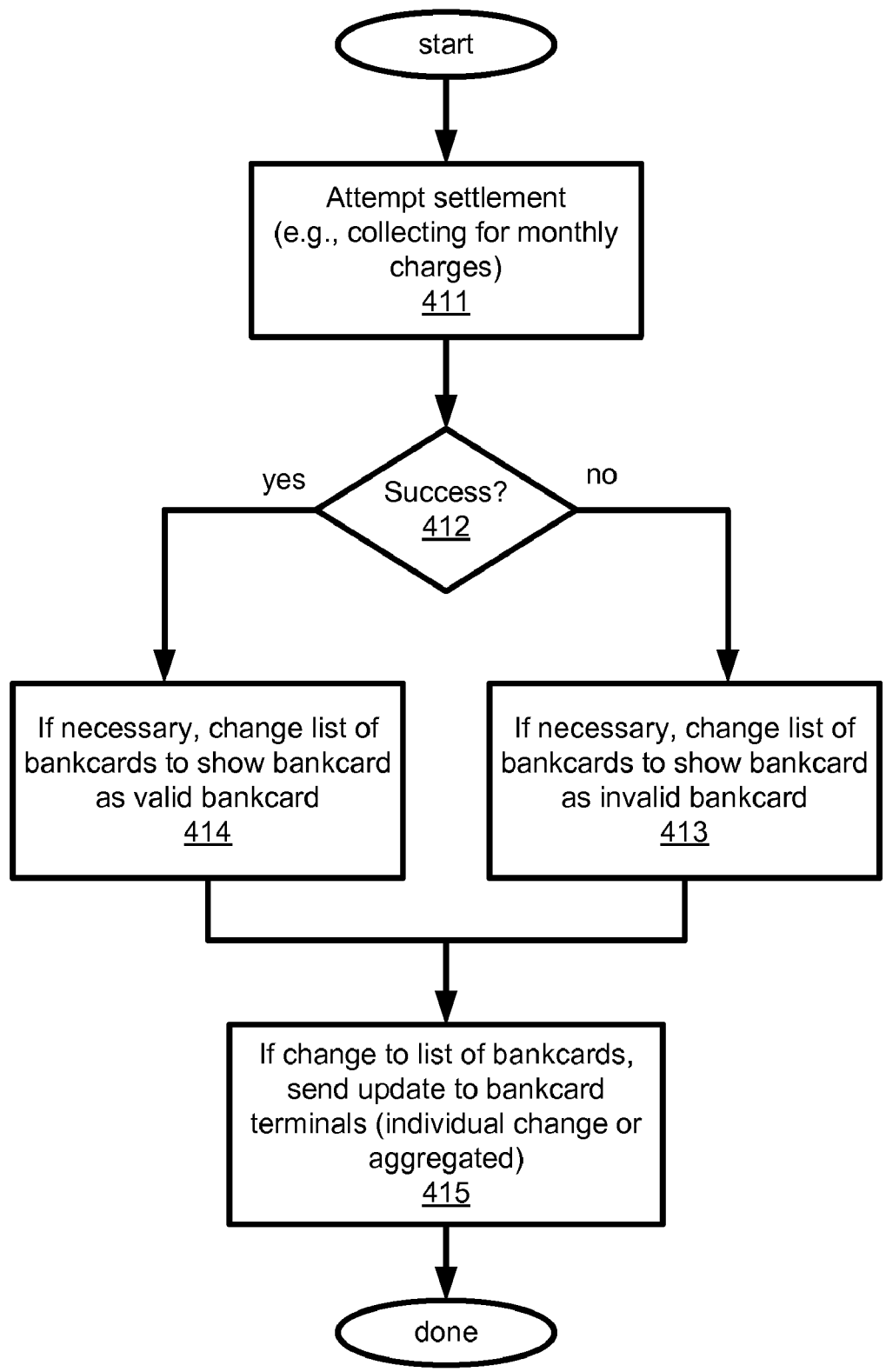
FIGS. 6 and 7 represent flowchart implementations for operations in a processing system, in accordance with embodiments of the present invention.
Figure 7:
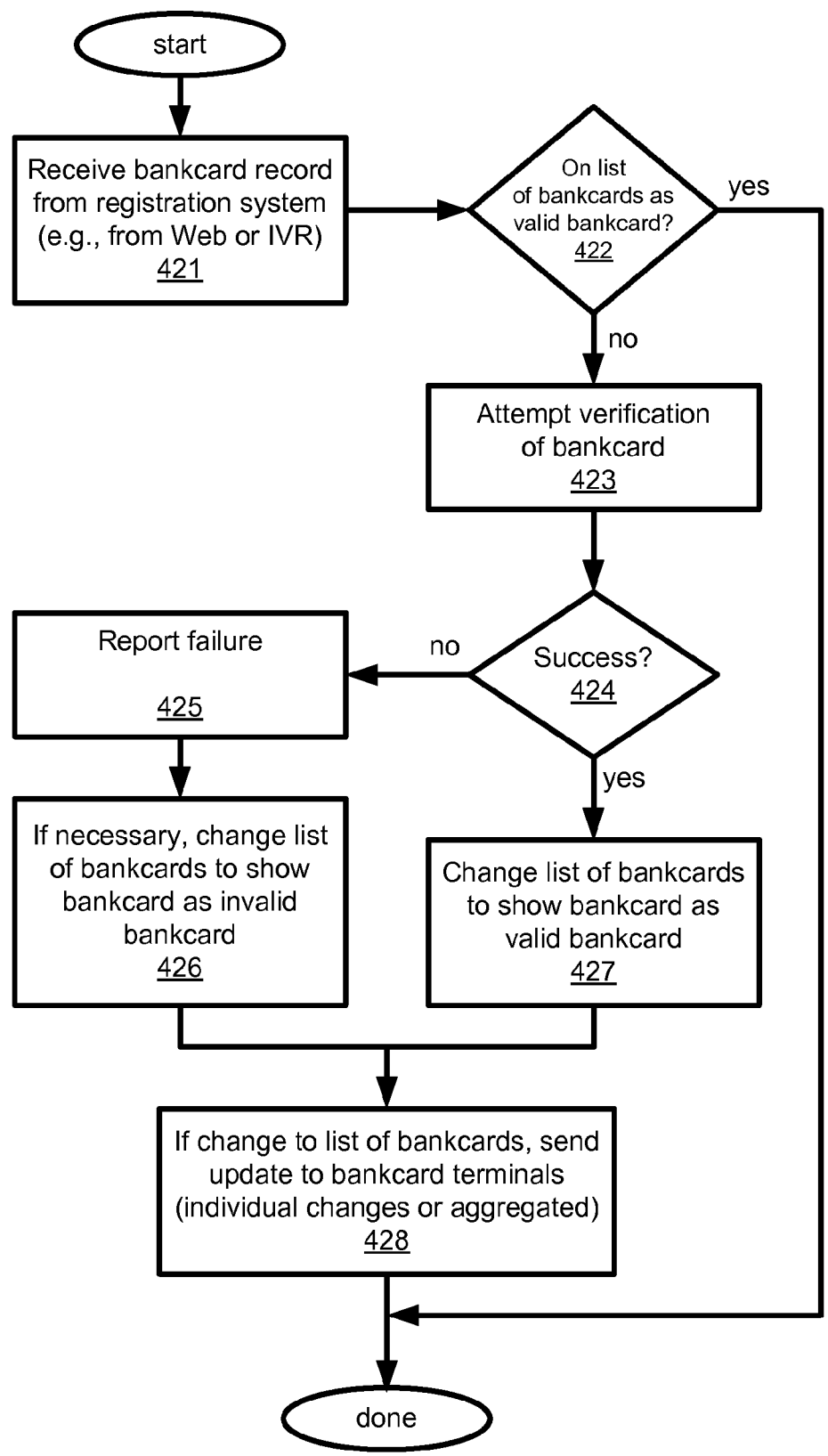

FIGS. 6 and 7 represent flowchart implementations for operations in a processing system, in accordance with embodiments of the present invention. In FIG. 6, at 411, processing system 300 attempts settlement, for example, to collect for monthly charges. At 412, a determination is made whether the attempt was successful. At 413, if the attempt was unsuccessful, the list of bankcards may be updated to indicate the bankcard is now invalid. At 414, if the attempt was successful, the list of bankcards may be updated to indicate the bankcard is valid. At 415, if changes are made to the list of bankcards, an update may be provided to each bankcard terminal. The update may be provided as a new list of bankcards that the bankcard terminal will use as a replacement list. Alternatively, the update may be provided as incremental changes to the existing list.

In FIG. 7, at 421 to 428, a process is shown to register bankcards with a back-end through a web interface, kiosk, telephone or other interactive system.

In some embodiments, the list of bankcards contains only bankcards presented to the system at the front-end through bankcard terminal. In other embodiments, the list of bankcards contains only bankcards presented to the system at the back-end through a registration system. Still in other embodiments, the list of bankcards contains only bankcards presented to the system at either the front-end or the back-end. In some embodiments, the list of bankcards contains only bankcards individually by a holder of the bankcard. In some embodiments, the list of bankcards contains only bankcards individually by a holder or holder's agent of the bankcard. In a sense, each of the presentations is learned by the system. In some embodiments, the list of bankcards includes bankcards presented by a financial institution, or the like, in addition to the learned bankcards.

The description above provides various hardware embodiments of the present invention. Furthermore, the figures provided are merely representational and may not be drawn to scale. Certain proportions thereof may be exaggerated, while others may be minimized. The figures are intended to illustrate various implementations of the invention that can be understood and appropriately carried out by those of ordinary skill in the art. Therefore, it should be understood that the invention can be practiced with modification and alteration within the spirit and scope of the claims. The description is not intended to be exhaustive or to limit the invention to the precise form disclosed. It should be understood that the invention can be practiced with modification and alteration.

What is claimed is:

1. A bankcard terminal for gating entry into a first transit system, the bankcard terminal comprising:
   a first interface to communicate with a processing system associated with a set of transit systems including the first transit system, wherein the first interface provides for uploading information to the processing system and downloading information from the processing system;
   a bankcard reader comprising a receiver to receive data, as bankcard data, upon a current presentation of a bankcard by a holder, wherein the bankcard comprises one of a credit card and a debit card;
   a processor, coupled to the bankcard reader and to the first interface, to receive the bankcard data and to generate a hash identifier based on the bankcard data from the currently presented bankcard, wherein the hash identifier comprises a hash of at least part of the bankcard data;
   memory, coupled to the processor, to hold a list of bankcards comprising, for each bankcard in the list, a hash identifier of a bankcard previously presented, by a respective holder of the bankcard, to the processing system; and
   a second interface, coupled to the processor, to send a signal to an access controller.

2. The bankcard terminal of claim 1, wherein the first interface comprises a wireless interface.

3. The bankcard terminal of claim 1, wherein the first interface comprises a wired interface.

4. The bankcard terminal of claim 1, wherein the receiver of the bankcard reader comprises a credit card reader.

5. The bankcard terminal of claim 1, wherein the receiver of the bankcard reader comprises a wireless receiver.

6. The bankcard terminal of claim 1, wherein:
   the bankcard data comprises a bankcard number; and
   the hash identifier of the currently presented bankcard is based on the unique bankcard identifier number.

7. The bankcard terminal of claim 6, wherein:
   the bankcard data further comprises a name of a card holder; and
   the hash identifier of the currently presented bankcard is further based on the name of the cardholder.

8. The bankcard terminal of claim 6, wherein:
   the bankcard data further comprises an expiration date; and
   the hash identifier of the currently presented bankcard is further based on the expiration date.

9. The bankcard terminal of claim 1, wherein the access controller comprises a turnstile.

10. The bankcard terminal of claim 1, wherein the access controller comprises a human.

11. The bankcard terminal of claim 1, wherein the access controller comprises at least one of audio feedback circuitry and visual feedback circuitry.

12. The bankcard terminal of claim 1, further comprising a third interface, coupled to the processor, to a bankcard verification system.

13. A method for validating entry into a first transit system using a bankcard terminal, the method comprising:
   downloading, from a processing system associated with a set of transit systems including the first transit system, a list of bankcards comprising, for each bankcard in the list, a hash identifier of a bankcard previously presented, by a respective holder of the bankcard, to the processing system, wherein the bankcard comprises one of a credit card and a debit card;
   receiving, from a bankcard reader, bankcard data comprising data from a bankcard currently presented by a holder of the bankcard;
   generating a hash identifier based on the bankcard data from the currently presented bankcard, wherein the hash identifier comprises a hash of at least part of the bankcard data;
   determining whether the currently presented bankcard is contained in the list of bankcards;
   verifying the currently presented bankcard with a bankcard verification system, if the bankcard was not contained in the list of bankcards; and
   denying access, if the act of verifying the currently presented bankcard with the bankcard verification system results in a determination of an invalid bankcard.

14. The method of claim 13, wherein:
   the bankcard data comprises a bankcard number; and
   the act of generating the hash identifier of the currently presented bankcard comprises generating the hash identifier based on the unique bankcard identifier number.

15. The method of claim 14, wherein:
   the bankcard data further comprises a name of a cardholder; and
   the act of generating the hash identifier of the currently presented bankcard further comprises generating the hash identifier based on the name of the bankcard holder.

16. The method of claim 14, wherein:
   the bankcard data further comprises an expiration date; and
   the act of generating the hash identifier of the currently presented bankcard further comprises generating the hash identifier based on the expiration date.

17. The method of claim 13, wherein the act of determining whether the currently presented bankcard is contained in the list of bankcards comprises using the generated hash identifier as a parameter in a lookup function.

18. The method of claim 13, wherein at least one of the bankcards previously presented comprises a presentation by the respective holder through a web interface.

19. The method of claim 13, wherein at least one of the bankcards previously presented comprises a presentation by the respective holder through a bankcard terminal.

20. The method of claim 13, wherein at least one of the bankcards previously presented comprises a presentation by the respective holder through an interactive telephone system.

21. The method of claim 13, wherein at least one of the bankcards previously presented comprises a presentation by the respective holder through a request through a financial institution.

22. The method of claim 13, wherein at least one of the bankcards previously presented comprises a presentation by the respective holder through a bankcard reader at a transit system from the set of transit systems.

23. The method of claim 13, wherein the act of verifying the currently presented bankcard with the bankcard verification system comprises verifying the currently presented bankcard with a clearing and settlement network.

24. The method of claim 13, wherein the act of verifying the currently presented bankcard with the bankcard verification system comprises receiving an authorization, from a clearing and settlement network, for an amount of funds from an account linked to the currently presented bankcard.

25. The method of claim 13, further comprising updating the list of bankcards with the generated hash identifier to show the bankcard as a known valid bankcard, if the act of verifying the bankcard results in a determination of a valid bankcard.

26. The method of claim 13, wherein the act of generating the hash identifier of the currently presented bankcard comprises generating a cryptographic hash.

27. The method of claim 13, further comprising allowing access if the bankcard is a known valid bankcard.

28. The method of claim 13, the method further comprising uploading, to the processing system, updates to the list of bankcards.

29. The method of claim 13, the method further comprising:
downloading, from the processing system, updates to the list of bankcards; and
incorporating the updates to the list of bankcards into the list of bankcards.

30. The method of claim 13, wherein the act of verifying the currently presented bankcard with the bankcard verification system results in a failed attempt.

31. The method of claim 13, wherein the act of verifying the currently presented bankcard with the bankcard verification system comprises receiving, from the bankcard verification system, an indication that the bankcard verification system rejected authorization of a financial charge.

32. A method for validating entry, into a first transit system, using a bankcard terminal, the method comprising:
downloading, from a processing system associated with a set of transit systems including the first transit system, a list of bankcards comprising, for each bankcard in the list, a hash identifier of a bankcard previously presented, by a respective holder of the bankcard, to the processing system, wherein the bankcard comprises one of a credit card and a debit card;
receiving, from a bankcard reader, bankcard data comprising data from a bankcard currently presented by a holder of the bankcard;
generating a hash identifier based on the bankcard data from the currently presented bankcard, wherein the hash identifier comprises a hash of at least part of the bankcard data;
determining whether the currently presented bankcard is contained in the list of bankcards;
denying access, if the currently presented bankcard is not contained in the list of bankcards; and
uploading, to the processing system, at least one bankcard identifier granted access to the first transit systems.

33. The method of claim 32, further comprising:
downloading, from the processing system, updates to the list of bankcards; and
incorporating the updates into the list of bankcards.

34. A processing system associated with a set of transit systems including at least one transit system, the processing system comprising:
a first interface to communicate with at least one bankcard terminal;
a processor coupled to the first interface;
memory, coupled to the processor, to hold a list of bankcards comprising, for each bankcard in the list, a hash identifier based on bankcard data from a bankcard previously presented, by a respective holder of the bankcard, to the processing system, wherein the bankcard comprises one of a credit card and a debit card and wherein the hash identifier comprises a hash of at least part of the bankcard data;
a second interface, coupled to the processor, to communicate with a bankcard verification system; and
a third interface, coupled to the processor, to communicate with a bankcard registration system.

35. A method for maintaining a list of bankcards at a processing system associated with a set of transit systems including at least one transit system, the method comprising:
receiving, from a bankcard registration system, bankcard data of a bankcard currently presented by a respective holder of the bankcard, wherein the bankcard comprises one of a credit card and a debit card;
providing a hash identifier based on bankcard data from the currently presented bankcard, wherein the hash identifier comprises a hash of at least part of the bankcard data;
determining whether the hash identifier is contained in a list of bankcards comprising, for each bankcard in the list, a hash identifier of a bankcard previously presented, by a respective holder of the bankcard, to the processing system;
verifying the currently presented bankcard with a bankcard verification system, if the bankcard is not contained in the list of bankcards; and
downloading, to at least one bankcard terminal, the list of bankcards.

36. The method of claim 35, further comprising incorporating the currently presented bankcard into the list of bankcards, if the act of verifying the currently presented bankcard with the bankcard verification system results in receiving an indication of a valid bankcard.

37. The method of claim 35, further comprising downloading, to at least one bankcard terminal, updates to the list of bankcards.

38. The method of claim 35, further comprising reporting a failure, if the act of verifying the bankcard results in a determination of an invalid bankcard.

39. The method of claim 35, further comprising removing, from the list of bankcards, the currently present bankcard, if the act of verifying the bankcard results in the determination of an invalid bankcard.

40. A computer-readable medium comprising machine readable code for performing the acts of:
downloading, from a processing system associated with a set of transit systems including the first transit system, a list of bankcards comprising, for each bankcard in the list, a hash identifier of a bankcard previously presented, by a respective holder of the bankcard, to the processing system, wherein the bankcard comprises one of a credit card and a debit card;
receiving, from a bankcard reader, bankcard data comprising data from a bankcard currently presented by a holder of the bankcard;
generating a hash identifier based on the bankcard data from the currently presented bankcard, wherein the hash identifier comprises a hash of at least part of the bankcard data;
determining whether the currently presented bankcard is contained in the list of bankcards;
denying access, if the currently presented bankcard is not contained in the list of bankcards; and
uploading, to the processing system, at least one bankcard identifier granted access to the first transit systems.

* * * * *